Feb. 7, 1956  D. J. BAUER  2,733,647
PLOW ATTACHMENT
Filed June 5, 1953  2 Sheets-Sheet 1
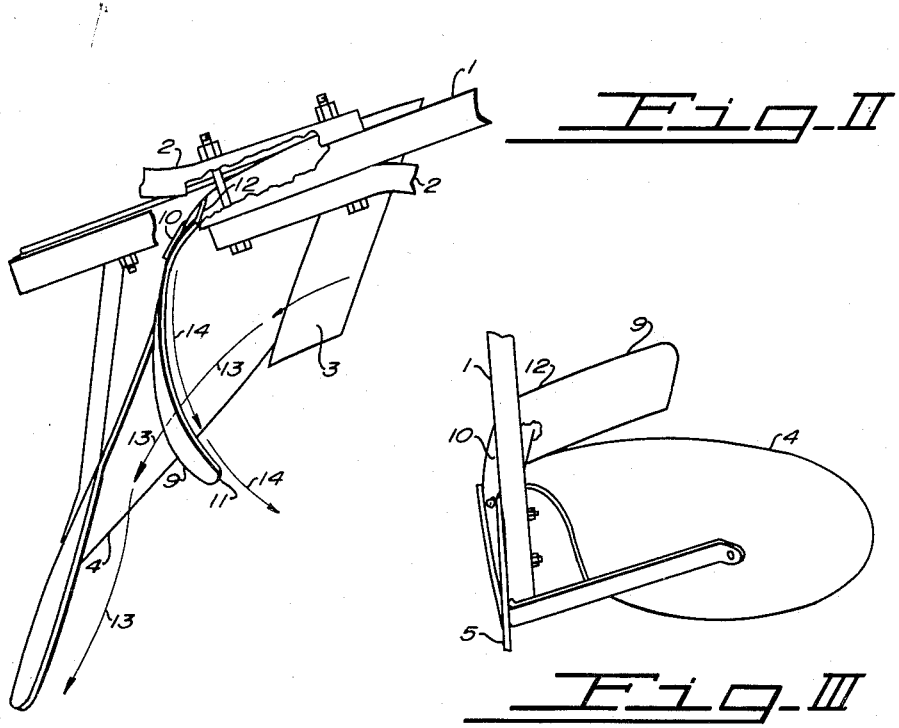
Fig. II
Fig. III
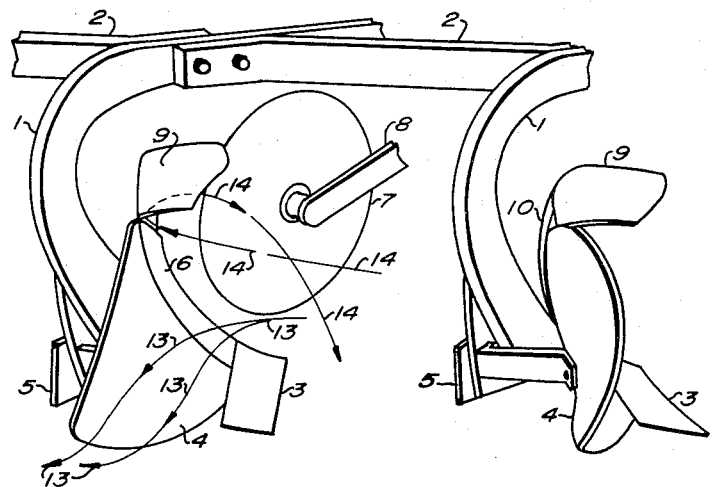
Fig. I
INVENTOR.
DONALD J. BAUER
BY
Marshall, Marshall & Heasting
ATTORNEYS Feb. 7, 1956 D. J. BAUER 2,733,647
PLOW ATTACHMENT
Filed June 5, 1953 2 Sheets-Sheet 2
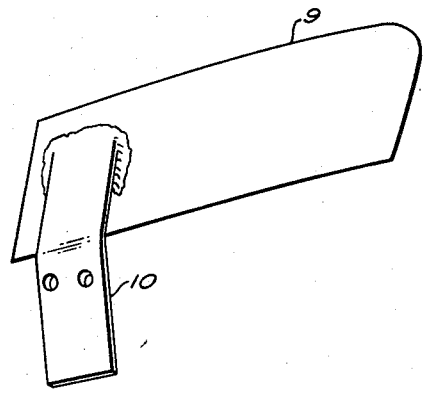
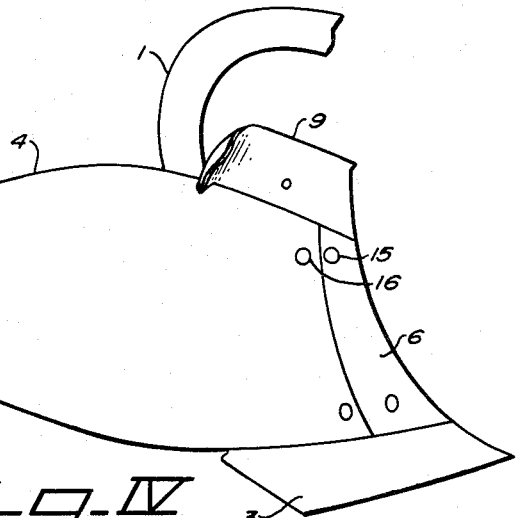
INVENTOR.
DONALD J. BAUER
BY
Marshall, Marshall *and* Yeasting
ATTORNEYS United States Patent Office 2,733,647
Patented Feb. 7, 1956

2,733,647

PLOW ATTACHMENT

Donald J. Bauer, Norwalk, Ohio

Application June 5, 1953, Serial No. 359,862

1 Claim. (Cl. 97—211)

This invention relates to plows and in particular to an attachment that promotes complete coverage of stalks and stubble remaining from previous crops.

It has always been difficult to completely cover the stalks and stubble of previous crops, particularly corn, when plowing the ground for a new crop. This follows because the corn stalks in particular are quite large in comparison with the width of a furrow and if they are dry they tend to ride the turning ground and remain exposed on the plowed ground. Various attachments have been proposed from time to time to drive such stubble or trash into the furrow being filled so that it will be completely buried therein. These devices take the form of rods or other finger like guides mounted on the plow and arranged to direct the stalks into the furrow or they may be in forms of wires fastened to the plow frame and trailed along in the furrow, i. e., trailed from the frame of the plow and leading into the furrow to drag the stalks down or other devices of similar nature. The difficulty with any of these arrangements is that if the stalks are dry and if there are very many of them they tend to clog in the plow rather than move smoothly into the furrow to be covered. This makes it necessary to stop frequently to clean out the stalks from the plow while many are left exposed.

The principal object of this invention is to provide a simple attachment that promotes substantially complete coverage of stalks, stems and trash from previous crops.

Another object of the invention is to provide a plow attachment that not only promotes complete coverage of trash and stubble but which also is substantially free from clogging.

A still further object is to provide a plow attachment which in operation provides a screen of flying ground directed so as to drive stalks and stems of previous crops down into the furrow where they may be covered by the ground being turned by the plow.

More specific objects and advantages are apparent from the following description of a preferred embodiment of the invention.

According to the invention, an attachment in the form of a blade mounted above the moldboard of a plow is arranged to catch or shear the edge of the ground being turned and direct the sheared portion laterally across the ground being turned so as to form a flying screen of ground directed generally into the furrow being filled and adapted to drive any stalks, stems, or trash of previous crops into the furrow where they may be covered by the ground being turned or plowed. The blade is mounted in such a position relative to the plowshare and moldboard that it is out of the way and will not collect stalks or stems so as to clog. Rather it is self-cleaning and the ground that is caught and diverted by the blade acts to draw any stalks through and away from the colter and beam of the plow. The blade consists of a strip of curved and slightly twisted material mounted immediately above the moldboard of a plow with a first portion co-planar with and immediately above the front or upper leading corner of the moldboard. The trailing end of the blade curves forward from the top edge of the moldboard and extends in a generally horizontal direction across the ground being turned with the end of the strip directed transversely of the furrow. The strip is of such a length that it extends nearly all the way across the furrow being turned but not over the furrow being filled. Rather the ground which is thrown as a screen by the blade extends across into the furrow being filled so as to supply the force to drive the stalks, stems, stubble, and other trash down into the furrow to be covered.

A preferred embodiment of the invention is shown in the accompanying drawings.

In the drawings:

Figure I is a side view, in perspective, of a portion of a three bottom gang plow equipped with the attachment. Two moldboards, one of the colters and a portion of the frame of the plow are included in the figure.

Figure II is a plan view, with parts broken away, of a plowshare, moldboard and the attachment or blade placed in position on the moldboard.

Figure III is a rear view of the plow moldboard with the attachment blade in position.

Figure IV is a front quarter view looking directly toward the moldboard of a plow showing the blade in position.

Figure V is an enlarged view of the blade removed from the plow.

These specific figures and the accompanying description are intended merely to illustrate the invention but not to impose limitations on its scope.

The plow attachment for promoting more complete coverage of stalks and stubble may be used with single plows or with gang plows. At the present time most of the plowing is done with tractors drawing gang plows having from two to four plowshares and moldboards. Many of the smaller gang plows use three plowshares and moldboards. Since the attachment is used with each of the moldboards it does not matter how many moldboards or how many plows are used in a gang as each is individually equipped. Therefore, in the drawings only a fragment of a gang plow is shown.

Referring to Figure I the gang plow may comprise one or more plow beams 1 that are fastened together in operative relation by a rigid framework 2. Each of the plow beams 1 has its lower end curved forwardly like a hook to receive a plowshare 3 and moldboard 4. Each of the plows is also equipped with a landslide 5 and preferably with a breaker strip 6. With many plows the breaker strip 6 is formed integrally with the moldboard 4 instead of being separate. However, many of the later plows are equipped with a separate strip 6 which may be easily replaced since it tends to wear faster than the moldboard.

Each plow is also preferably equipped with a rolling colter 7 carried from a yoke 8 which is pivotally supported from the frame 2.

To assist in turning the trash and stubble under, each of the plows is equipped with an attachment in the form of a blade 9 which is mounted on a bracket 10 so that the blade 9 lies immediately above and substantially co-planar with the leading upper portion of the moldboard or the breaker strip 6. The blade 9 as may be seen in Figures II, III and IV has its leading end immediately above and co-planar with the top part of the moldboard and then from that position curves forward in the direction of motion from the moldboard in a generally horizontal direction from its leading end and curves forwardly enough so as to have its trailing end directed nearly perpendicular to the furrow being turned. The curve is made as smooth as possible except at the trailing tip 11 where the blade turns forward slightly more sharply. Also the blade is slightly twisted so that its leading end 12 may conform to the shape of moldboard and be substantially vertical and the trailing tip 11 be twisted to direct the earth being thrown by it slightly downwardly as well as transversely of the furrow.

For an ordinary plow adapted to turn a twelve to fourteen inch furrow the blade 9 is made approximately four inches wide and from fourteen to eighteen inches long. These dimensions are selected according to the size of the furrow so that the width of the blade is from ⅕ to ⅓ the width of the furrow and the length is slightly longer but not more than twice as long as the width of the furrow. These dimensions or proportions may be varied over wide ranges without materially affecting the operation of the device. The requirement is that the blade 9 be positioned above the moldboard 4 so that it shears the upper edge of the furrow or ground being turned so as to throw the sheared ground, i. e., the upper edge, forwardly across the main body being turned and into the furrow being filled sufficiently ahead of the major portion of the ground so that any weeds, stems, stalks, and trash will be carried or knocked down into the furrow and held there by this ground while they are being covered by the remainder of the ground being turned. Thus as may be seen in Figure II the main portion of the ground being turned follows along the arrows 13 passing beneath the blade 9 and being rolled over or turned by the trailing end of the moldboard 4. The upper edge of the ground or the upper portion which was cut by the colter 7 and which tends to ride above the level of the moldboard 4 is caught by the blade 9 and driven along the direction of the arrows 14 so as to be directed transversely of the furrow so as to knock the stems and the stubble down into the furrow being closed before the ground from the moldboard 4 comes along to fill the furrow.

The blade 9 is preferably mounted by a bracket 10 that is fitted to the bolts that hold the moldboard to the saddle of the plow or to the plow beam 1. With the type of plow shown in the figures and in particular Figure IV the bracket 10 may be mounted from bolts 15 and 16 used to hold the leading edge of the moldboard in position. While ordinarily it is not necessary to make the position of the blade 9 adjustable, that can be done if desired by suitably modifying the bracket 10.

The particular curve for the blade 9 is developed by the conflicting requirements that (a) the sheared ground be thrown across the turning ground and into the furrow and (b) that it shall not be so sharp as to cause the ground to pile up on the blade rather than sliding smoothly along the curve. If the blade is curved too sharply then it tends to push the ground forward and sidewards rather than throwing it across the turning ground. If the blade has too little curvature then the ground being sheared and thrown does not come across soon enough or far enough in advance to knock the stubble and stalks down into the furrow where they may be covered. Thus a blade with too little curvature merely acts like an additional part of the plow moldboard and one that has too much curvature or that is too sharp tends to act like a hook and merely collect ground and scrape it along. With a curvature substantially as shown in the drawings in which the leading end 12 of the blade is parallel with the upper leading corner of the moldboard 4 and in which the trailing end 11 of the blade extends substantially at right angles to the furrow being turned the ground tends to flow smoothly and be thrown as a screen across the furrow to knock the stubble and stalks down into the furrow where they may be well covered.

This arrangement is much more satisfactory in use than conventional rods, guides, or other devices to push the stubble down into the furrow. With such other devices particularly if the stalks are large and dry, the stalks tend to slide along and collect on the rods rather than being pushed down into the furrow. With the blade 9 substituted for such rods and providing the screen of flying ground to actually supply the force to the stubble there is no trouble with clogging. If unusually large stalks are encountered an incomplete coverage may occur but there is nothing to catch or clog. The operation is one of throwing the ground onto the stubbles to drive them down without giving them any chance to collect against any of the stationary parts of the plow.

In addition to promoting complete coverage of stalks, stubble, and trash, the blade 9 permits the plow to be driven or drawn at considerably higher speeds. As the speed is increased above four and one-half to five miles per hour the ground that comes toward the top of the moldboard tends to be thrown upward across and beyond the furrow being filled. The addition of the blade 9, however, tends to check this and by the twist of the trailing end 11 directs such ground downwardly so that it falls directly into the furrow. This prevents the scattering that accompanies the high-speed operation of conventional plows. Even at the higher speed, with the blade 9 the ground that is thrown across is still very effective in driving the weeds, stems, stalks, and stubble from previous crops down into the furrow where they may be well covered.

Various modifications of the blade and its means of attachment to the plow may be made without departing from the spirit and scope of the invention.

Having described the invention, I claim:

A jointer attachment for a plow moldboard for promoting complete coverage of stubble of previous crops, the attachment comprising a curved blade having a first end straight section, said first end section being positionable immediately above and co-planar with the upper forward part of the moldboard of the plow and the remainder of the blade curving across the furrow being plowed on a level with the top of the moldboard, the trailing end of said blade being at substantially right angles to the furrow being plowed and horizontal to the ground, said blade being twisted at its outer trailing tip end to divert a portion of the ground being turned to a path leading across the main portion of the turning ground and generally downwardly into the far side of the furrow being filled, said twisted tip end serving to divert stubble and old crop stalks to the bottom of the furrow being filled.

References Cited in the file of this patent

UNITED STATES PATENTS

| | | |
|---|---|---|
| 201,387 | Carpenter | Mar. 19, 1878 |
| 338,481 | Casaday | Mar. 23, 1886 |
| 362,023 | Lowden | Apr. 26, 1887 |
| 456,053 | McAvry | July 14, 1891 |
| 471,420 | Edwards | Mar. 22, 1892 |
| 663,714 | Armstrong, Sr. | Dec. 11, 1900 |
| 833,789 | Machia | Oct. 23, 1906 |
| 1,433,614 | Hayes | Oct. 31, 1922 |